No. 781,849. PATENTED FEB. 7, 1905.
A. W. SMITH.
MOP HOLDER.
APPLICATION FILED FEB. 25, 1904.
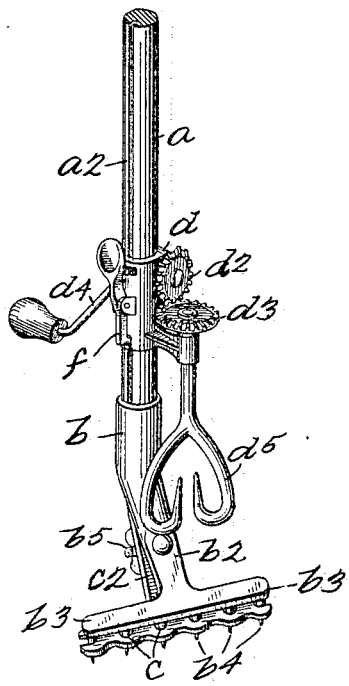
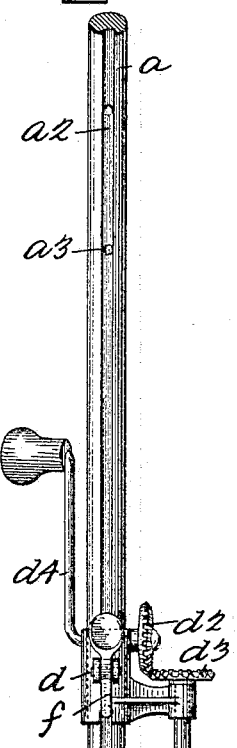
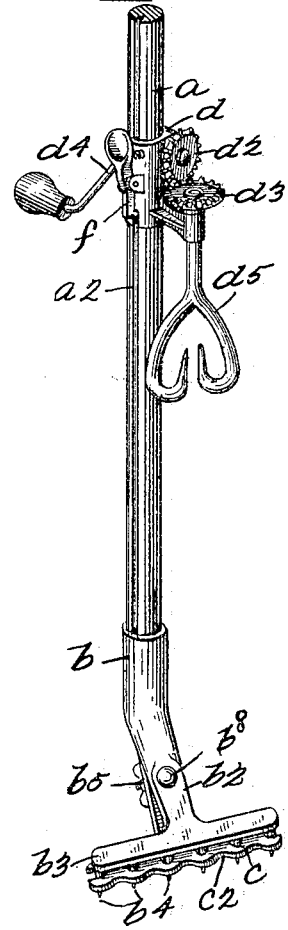
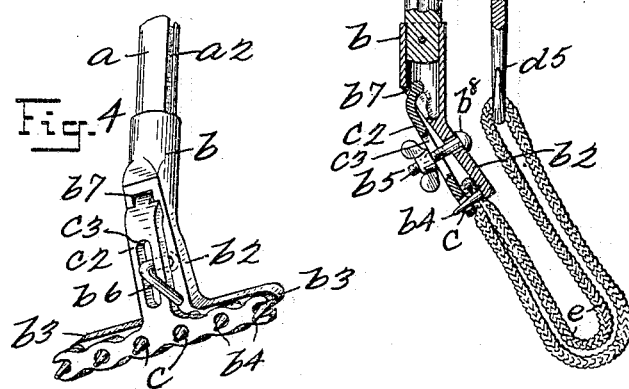
Witnesses
Inventor
Arthur W. Smith
By Attorney No. 781,849. Patented February 7, 1905.

UNITED STATES PATENT OFFICE.

ARTHUR W. SMITH, OF THOMASTON, NEW YORK.

MOP-HOLDER.

SPECIFICATION forming part of Letters Patent No. 781,849, dated February 7, 1905.

Application filed February 25, 1904. Serial No. 195,185.

*To all whom it may concern:*

Be it known that I, ARTHUR W. SMITH, a citizen of the United States of America, residing at Thomaston, in the county of Nassau and State of New York, have invented certain new and useful Improvements in Mop-Holders, of which the following is a specification, such as will enable those skilled in the art to which it appertains to make and use the same.

The object of this invention is to provide an improved mop-holder upon which a mop may be quickly and readily placed, be securely held thereon, and easily removed therefrom, and a further object being to provide such a holder which is light, strong, simple in construction and operation, comparatively inexpensive, and which, being composed of few parts, will not easily get out of order.

My invention is fully described in the following specification, of which the accompanying drawings form a part, in which the separate parts thereof are indicated by suitable reference characters in each of the views, in which—

Figure 1 is a perspective view of a mop-holder constructed according to my invention and in operative position; Fig. 2, a similar view thereof with the parts out of operative position; Fig. 3, a side view thereof, partially in section, the mop being indicated in operative position; and Fig. 4, a bottom view of the holder proper and showing a modification of the construction shown in the preceding figures.

In the drawings forming a part of this specification I have shown a handle $a$, provided with a longitudinal groove $a^2$ and a plurality of holes $a^3$ therein and the object of which will be hereinafter explained, and at the bottom end of the handle $a$ is a block $b$, provided with an inclined downwardly-extending member $b^2$ and the member $b^2$ being provided with arms $b^3$ at right angles thereto, said arms being provided with downwardly-projecting teeth $b^4$, which pass through corresponding openings $c$ in a plate $c^2$, shaped similarly to the block $b$, said block being provided with a screw-threaded bolt $b^8$ and nut $b^5$ or, as shown in Fig. 4, with a pivoted lever $b^6$ and which passes through a corresponding slot $c^3$ in the plate $c^2$, and the end of this plate is shouldered and passes into and is engaged by a recess $b^7$ in the block $b$, being removable therefrom when turned at an angle thereto.

Slidably mounted upon the handle $a$ is a sleeve $d$, which carries two bevel-gears $d^2$ and $d^3$, a crank $d^4$ being secured to the gear $d^2$ and a hook $d^5$ with the gear $d^3$, and the rotation of the crank $d^4$ thereby rotates the hook $d^5$, and, as shown in Fig. 3, one end of a mop $e$ is engaged by the hook $d^5$, the other end of said mop being engaged by the teeth $b^4$ and tightly clamped by the bolt $b^8$ and nut $b^5$ or other suitable device.

Connected with the sleeve $d$ and over the groove $a^2$ is a spring-operated latch $f$, the end of which passes into and slides in the said groove and is engaged by one of the holes $a^3$, which are arranged at intervals therein, and when the latch $f$ is so engaged by one of the holes $a^3$ the sleeve $d$ is securely held against movement on the handle $a$.

When it is desired to use the mop, the sleeve $d$ is lowered to a position close to the block $b$, which slackens the mop $e$ and permits the same the necessary freedom of movement, and in this position of the parts the mop may be rinsed, after which the sleeve $d$ is drawn to the limit of the mop $e$ and locked by the latch $f$, and by the turning of the crank $d^4$ and hook $d^5$ the mop $e$ is twisted until it is taut, and the water is thereby squeezed out, after which it is returned to the position first mentioned and is ready for another operation.

Having fully described my invention, what I claim as new, and desire to secure by Letters Patent, is—

In a mop-holder, a handle, a hook slidably mounted on the handle to be engaged with one end of a mop, a block secured on the lower end of the handle, a forwardly-inclined plate carried by the block, and provided at its lower end with pins, a back plate having its upper end received in a recess provided therefor in the block, and provided at its lower end with holes to receive the said pins, and a bolt passed through both of said plates to bind the other end of said mop therebetween, substantially as described.

In testimony that I claim the foregoing as my invention I have signed my name, in presence of the subscribing witnesses, this 23d day of February, 1904.

ARTHUR W. SMITH.

Witnesses:
C. K. McGUIRE,
GEORGE A. DUCK.